(12) United States Patent
Bartenbach et al.

(10) Patent No.: US 10,495,123 B2
(45) Date of Patent: Dec. 3, 2019

(54) CLIP CONNECTION

(71) Applicant: Mahle International GmbH, Stuttgart (DE)

(72) Inventors: Bernd Bartenbach, Talheim (DE); Richard Goce, Stuttgart (DE)

(73) Assignee: Mahle International GmbH (DE)

( * ) Notice: Subject to any disclaimer, the term of this patent is extended or adjusted under 35 U.S.C. 154(b) by 277 days.

(21) Appl. No.: 14/973,692

(22) Filed: Dec. 17, 2015

(65) Prior Publication Data

US 2016/0177986 A1 Jun. 23, 2016

(30) Foreign Application Priority Data

Dec. 18, 2014 (DE) .................. 10 2014 226 484

(51) Int. Cl.
*F16B 5/00* (2006.01)
*F16B 5/06* (2006.01)
*F16B 19/02* (2006.01)
*F16B 21/08* (2006.01)

(52) U.S. Cl.
CPC .......... *F16B 5/0657* (2013.01); *F16B 5/0664* (2013.01); *F16B 19/02* (2013.01); *F16B 21/086* (2013.01); *Y10T 403/32475* (2015.01)

(58) Field of Classification Search
CPC ...... F16B 5/0092; F16B 21/04; F16B 5/0657; F16B 5/0664; F16B 21/086; F16B 19/02; F16B 5/10; F16B 21/125; E05B 63/125; Y10T 403/7007; Y10T 403/7005; Y10T 403/32475
See application file for complete search history.

(56) References Cited

U.S. PATENT DOCUMENTS

| | | | | |
|---|---|---|---|---|
| 195,400 A | * | 9/1877 | Richard | F16G 11/04 403/275 |
| 765,225 A | * | 7/1904 | Colin | F16L 37/252 285/148.1 |
| 1,194,793 A | * | 8/1916 | Styers | F16L 37/252 285/148.19 |
| 2,900,697 A | * | 8/1959 | Cuss | F16B 5/10 411/330 |

(Continued)

FOREIGN PATENT DOCUMENTS

| | | |
|---|---|---|
| DE | 102005027119 A1 | 1/2007 |
| DE | 102010041356 A1 | 3/2012 |

(Continued)

OTHER PUBLICATIONS

English abstract for DE-102005027119.
English abstract for DE-102010056412.
German Search Report for DE-102014226484.7, dated Sep. 7, 2015.

*Primary Examiner* — Matthew R McMahon
(74) *Attorney, Agent, or Firm* — Fishman Stewart PLLC

(57) ABSTRACT

A clip connection for connecting two components may include a latching contour arranged on the first component, and a mating latching contour arranged on the second component. The latching contour may have an arrow tip, and the mating latching contour may have a complementary opening with a periphery forming the mating latching contour. The latching contour and the mating latching contour may be positioning devices for positioning the components correctly in relation to one another.

9 Claims, 4 Drawing Sheets

(56) References Cited

U.S. PATENT DOCUMENTS

| | | | | |
|---|---|---|---|---|
| 3,390,589 A * | 7/1968 | Tschanz | F16C 1/262 | 24/625 |
| 3,476,008 A * | 11/1969 | Pearson et al. | F16B 21/086 | 411/508 |
| 4,711,595 A * | 12/1987 | Magid | B25B 27/14 | 403/108 |
| 4,732,505 A * | 3/1988 | Gloystein | B65D 90/0013 | 24/287 |
| 4,898,493 A * | 2/1990 | Blankenburg | F16B 21/088 | 403/326 |
| 4,927,287 A * | 5/1990 | Ohkawa | F16B 21/086 | 24/297 |
| 5,368,427 A * | 11/1994 | Pfaffinger | F16B 21/04 | 24/580.1 |
| 5,511,919 A * | 4/1996 | Scalise | F16B 21/04 | 411/182 |
| 5,542,773 A * | 8/1996 | Tu | B62B 1/125 | 403/109.5 |
| 5,626,435 A * | 5/1997 | Wohlhuter | B60D 1/52 | 280/416.1 |
| 5,915,482 A * | 6/1999 | Carruthers | A01B 1/227 | 172/375 |
| 6,079,894 A * | 6/2000 | Obitts | A61H 3/02 | 135/75 |
| 6,322,284 B1 * | 11/2001 | Bonardo | B60K 23/02 | 285/376 |
| 6,343,890 B1 * | 2/2002 | Benson | F16B 7/105 | 285/301 |
| 6,398,295 B2 * | 6/2002 | Asai | B60J 3/0221 | 296/146.7 |
| 6,435,790 B1 * | 8/2002 | Ichikawa | F16B 5/0642 | 24/453 |
| 6,575,504 B2 * | 6/2003 | Roatis | E05B 17/0029 | 292/199 |
| 7,350,999 B2 * | 4/2008 | Brletich | B65F 1/122 | 403/10 |
| 7,481,692 B2 * | 1/2009 | Bruder | A63H 33/101 | 446/111 |
| 7,607,875 B2 * | 10/2009 | Shinozaki | F16B 19/1081 | 411/21 |
| 7,644,975 B2 | 1/2010 | Ryan et al. | | |
| 7,730,930 B2 * | 6/2010 | Malausa | B60J 1/2019 | 160/310 |
| 8,141,455 B2 * | 3/2012 | Ogburn | B62B 5/06 | 74/551.8 |
| 8,157,470 B2 * | 4/2012 | De Wilde | A63H 33/106 | 403/348 |
| 8,221,041 B2 * | 7/2012 | Hauser | F16B 5/10 | 411/349 |
| 8,353,496 B2 * | 1/2013 | Schwartz | A47G 33/004 | 248/154 |
| 8,465,221 B2 * | 6/2013 | Yan | H05K 7/1489 | 248/220.22 |
| 8,591,160 B2 * | 11/2013 | Shinozaki | F16B 5/0628 | 24/458 |
| 8,695,177 B2 * | 4/2014 | Kato | F16B 21/065 | 24/292 |
| 8,939,691 B2 * | 1/2015 | Tseng | F16B 21/04 | 411/347 |
| 9,045,257 B2 * | 6/2015 | Nolet | B25G 1/10 | |
| 9,145,909 B2 * | 9/2015 | Lepper | F16B 5/0657 | |
| 9,188,145 B2 * | 11/2015 | Li | F16B 5/10 | |
| 9,291,180 B2 * | 3/2016 | Nakazato | F16B 5/10 | |
| 9,546,675 B2 * | 1/2017 | Evitt | A47B 47/005 | |
| 9,664,222 B2 * | 5/2017 | Evitt | F16B 21/09 | |
| 10,077,790 B2 * | 9/2018 | Betancourt Santana | B60R 13/00 | |
| 2005/0079011 A1 * | 4/2005 | Groff | A47G 7/044 | 403/348 |
| 2005/0249550 A1 * | 11/2005 | Liang | B25G 1/04 | 403/348 |
| 2008/0056816 A1 * | 3/2008 | Sussenbach | F16B 5/065 | 403/348 |
| 2012/0009013 A1 * | 1/2012 | Evitt | A47B 47/005 | 403/349 |
| 2012/0051831 A1 * | 3/2012 | Waters, Jr. | E01C 11/14 | 403/11 |
| 2012/0073089 A1 | 3/2012 | Buillas | | |
| 2013/0212858 A1 | 8/2013 | Herzinger et al. | | |

FOREIGN PATENT DOCUMENTS

| | | | |
|---|---|---|---|
| DE | 102010056412 A1 | 6/2012 | |
| FR | 591714 A * | 7/1925 | E05B 63/125 |
| GB | 2166211 A * | 9/1984 | E05B 79/12 |
| GB | 2166211 A | 4/1986 | |
| WO | WO-8800637 A1 * | 1/1988 | E05B 63/125 |

* cited by examiner

CLIP CONNECTION

CROSS-REFERENCE TO RELATED APPLICATIONS

This application claims priority to German Patent Application No. 10 2014 226 484.7, filed Dec. 18, 2014, the contents of which are hereby incorporated by reference in their entirety.

TECHNICAL FIELD

The present invention relates to a clip connection for connecting two components, wherein a latching contour is arranged on a first component and a mating latching contour is arranged on a second component. The invention also relates to a housing with two housing parts connected via such a clip connection.

BACKGROUND

GB 2 166 211 A discloses a clip connection of the type in question for connecting two components, in this case a rod and a support, wherein a latching contour is arranged on the rod and a mating latching contour is arranged on the support.

In order for it to be possible for, for example, two housing parts of a housing to be connected to one another via a clip connection, use is usually made, in addition to the actual clip connection, of so-called positioning bosses, which force the two housing parts into the correct position prior to the clip connection being closed. Of course, instead of the clip connection it is also possible to use screws or other connecting elements, although these always have to be provided in addition to the positioning bosses.

This nevertheless results not just in increased tool costs, for producing both a clip connection and the positioning bosses, but, in addition, also in increased material outlay, since the clip connection and the positioning bosses are formed separately.

SUMMARY

The present invention therefore deals with the problem of providing, for a clip connection of the type in question, an improved, or at least an alternative, embodiment, which is, in particular, more cost-effective.

This problem is solved according to the invention by the subject matter of the independent claims. Advantageous embodiments form the subject matter of the dependent claims.

The present invention is based on the general idea of now integrating in the clip connection a hitherto separate positioning device and therefore, in addition to cutting back the amount of material used, since the positioning device no longer has to be produced separately, also being able to use more cost-effective tools. The clip connection according to the invention for connecting two components has a latching contour on the first component and a complementary mating latching contour on the second component. The latching contour has an arrow tip, while the mating latching contour has a complementary opening with a periphery forming the mating latching contour. The latching contour and the mating latching contour, at the same time, are designed according to the invention in the form of a positioning device for positioning the components correctly in relation to one another immediately prior to the clip connection being closed. Unifying the positioning and clip functions cuts back on the amount of material used and therefore reduces costs. It is likewise possible for the tool costs to be lowered, in particular if the clip connection is designed in the form of a plastics injection moulding.

In the case of an advantageous development of the solution according to the invention, the arrow tip is designed in the form of a conical tip, of a crosshead tip or of a blade tip with resilient or fixed barbs forming the latching contour. Even just this list, which is not exhaustive, gives a sense of the conceivable variety of embodiments for the arrow tip, wherein the arrow tip, at the same time, forms the positioning geometry via which the first component can be positioned relative to the second component by virtue of the arrow tip simply being introduced into the associated opening. It is possible here for the barbs to be designed in the form of elastically resilient barbs and thus to be pushed together when the arrow tip is introduced into the associated opening, or else to be designed in the form of fixed barbs, for example in the form of a barb contour which is integrated in a fixed state in the arrow tip.

In the case of an advantageous development of the solution according to the invention, the arrow tip is designed in the form of a blade tip, while the opening is designed in the form of a slot. This allows the arrow tip to be fixed in the opening by rotation and also to be removed again from the slot-like opening by rotation in the opposite direction. Such a clip connection is designed here in the manner of a bayonet closure, it being conceivable for a longitudinal extent of the slot to be slightly smaller than the width of the blade of the blade tip, and therefore an actual clip connection can be realized here too.

In the case of an advantageous development of the solution according to the invention, the arrow tip is designed in the form of a crosshead tip with four barbs, whereas the annular periphery which forms the mating latching contour is interrupted at four locations, and therefore the latching contour can be released from the mating latching contour by rotation. In this case, the four barbs may be designed, for example, in the form of fixed barbs, that is to say non-elastic barbs, while the four annular segments of the periphery which forms the mating latching contour are elastic and thus allow the clip connection. If the barbs are radially congruent with the respective peripheral segment, the clip connection is closed, whereas the latter can be opened by the four barbs being moved into radial alignment with the interruptions of the annular periphery. The clip connection according to the invention can be closed here by virtue of the arrow tip simply being pushed into the associated opening, whereas release is made possible by corresponding rotation of the arrow tip in the opening.

In the case of an advantageous development of the solution according to the invention, the latching contour and/or the mating latching contour are/is formed from plastics material, in particular in the form of a plastics injection moulding. This allows a particularly cost-effective, but at the same time high-quality, design of the clip connection according to the invention.

Further important features and advantages of the invention can be gathered from the dependent claims, from the drawings and from the associated description of the figures with reference to the drawings.

It is, of course, the case that the features which have been mentioned above, and are yet to be explained below, can be used not just in the combination given in each case, but also in other combinations or on their own, without departing from the framework of the present invention.

Preferred exemplary embodiments of the invention are illustrated in the drawings and will be explained in more detail in the following description, wherein like designations refer to like or similar or functionally identical components.

DETAILED DESCRIPTION

Figure 1:
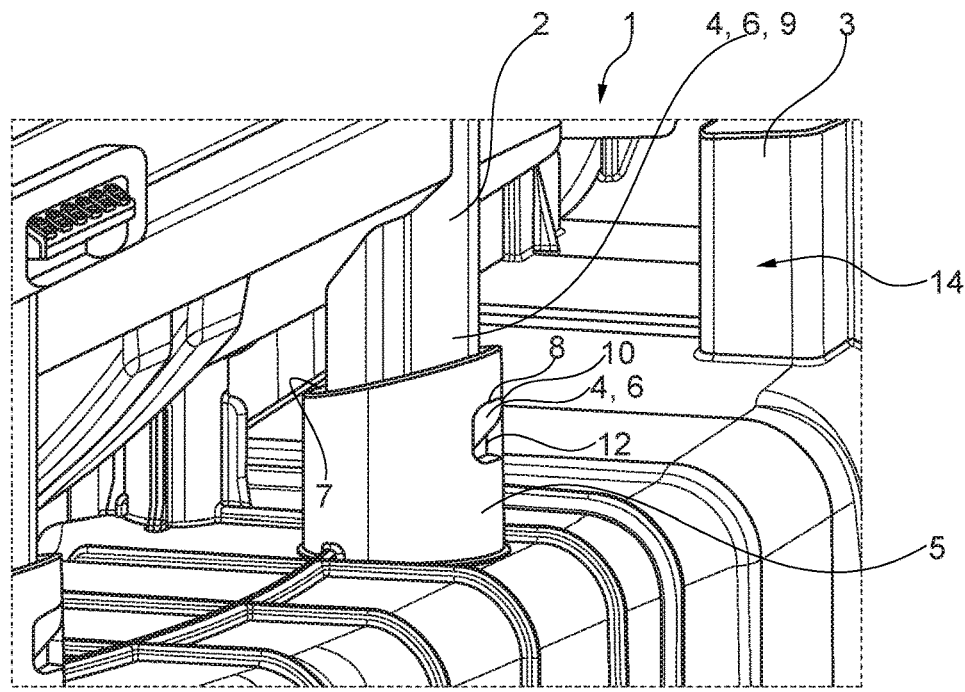
FIG. 1 shows a view of a clip connection according to the invention for two components.

In FIGS. 1 to 7, a clip connection 1 according to the invention for connecting two components 2 and 3 has a latching contour 4 arranged on the first component 2 and a mating latching contour 5 arranged on the second component 3. According to the invention here, the latching contour 4 has an arrow tip 6, whereas the mating latching contour 5 has a complementary opening 7 with a periphery 8 forming the mating latching contour 5. Furthermore, the latching contour 4 and the mating latching contour 5, at the same time, are designed in the form of a positioning device 9 for positioning the two components 2, 3 correctly in relation to one another. According to the invention, therefore, the positioning device 9 is integrated in the clip connection 1, as a result of which it is possible to dispense with further, separate positioning elements, for example positioning bosses.

Figures 4A, 4B:
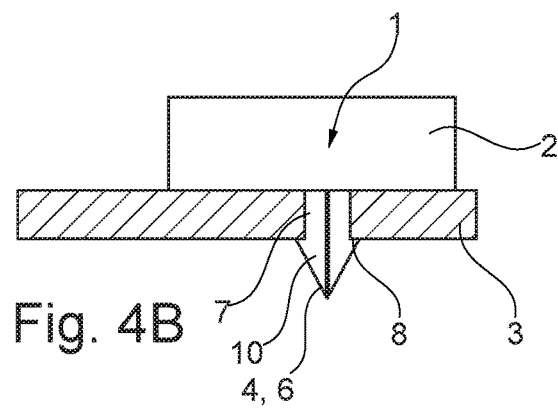
FIGS. 4a-c show sectional illustrations through further possible embodiments of different clip connections.
Figure 4C:
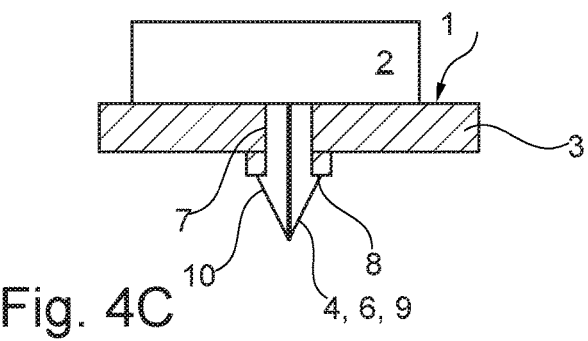
Figure 5:
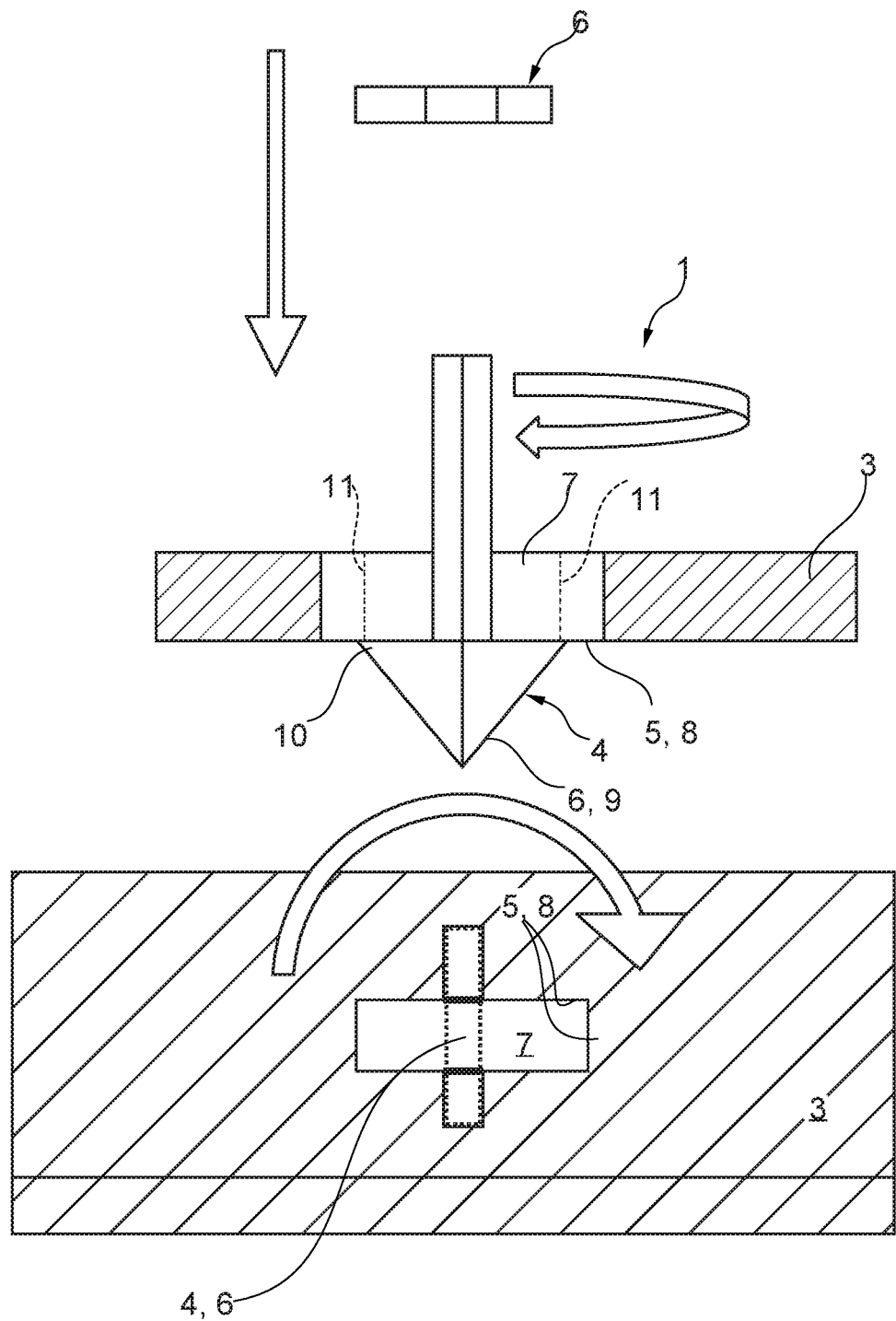
FIG. 5 shows a clip connection according to the invention with a blade tip.
Figure 6:
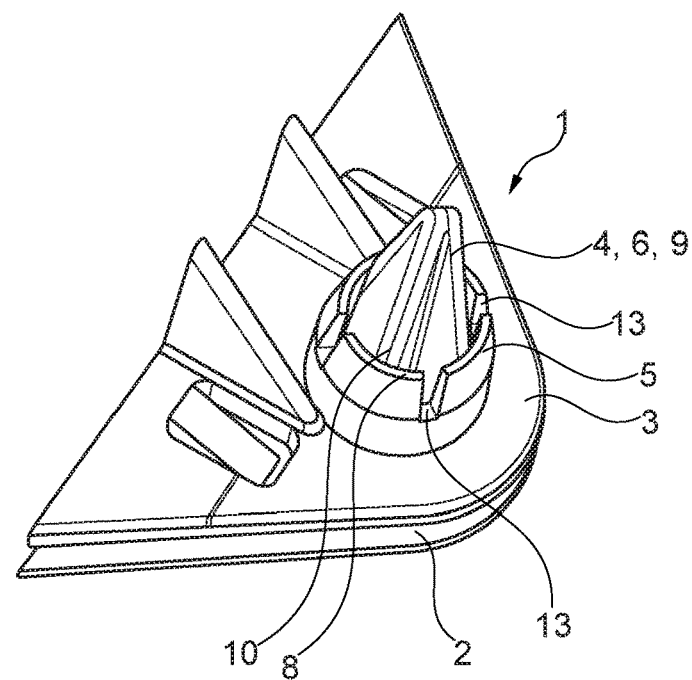
FIG. 6 shows a further possible embodiment of the clip connection according to the invention, in the released state.
Figure 7:
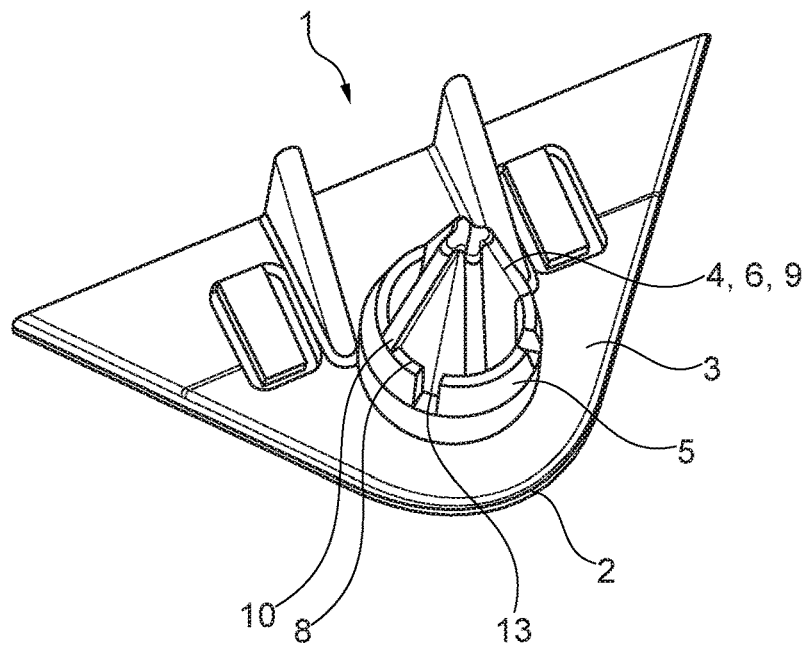
FIG. 7 shows an illustration as in FIG. 6, but with the clip connection closed.

Looking at, for example, the clip connection 1 according to the invention in FIGS. 1 to 4 and also 6 and 7, it can be seen that the arrow tip 6 is designed in the form of a crosshead tip, wherein, according to FIGS. 1 to 3, 4a, 4c and 5, the barbs 10 forming the latching contour 4 are designed in the form of fixed barbs 10, whereas, according to FIGS. 4b and 6, they are designed in the form of elastic resilient barbs 10.

Looking at FIG. 5, it can be seen that the arrow tip 6 is designed in the form of a blade tip, while the opening 7 is designed in the form of a slot. As a result, the arrow tip 6 can be fixed in the opening 7 by rotation. In the embodiment depicted, the opening 7 is wider than the blade of the arrow tip 6, and therefore the latter can be introduced into the opening 7, purely theoretically, in a contactless manner. It is usually the case however, for clipping the clip connection 1, that the opening 7 is slightly smaller than the largest dimension of the arrow tip 6, which is indicated in FIG. 5, for example, by the interrupted line 11.

Figure 2:
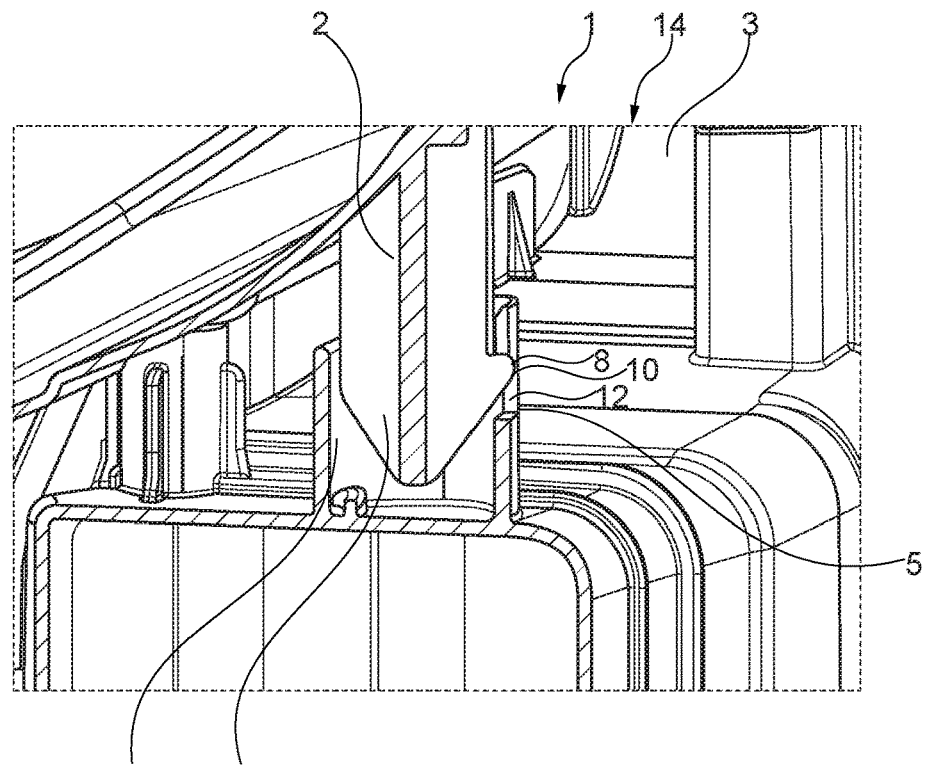
FIG. 2 shows a sectional illustration through the clip connection illustrated according to FIG. 1.
Figure 3:
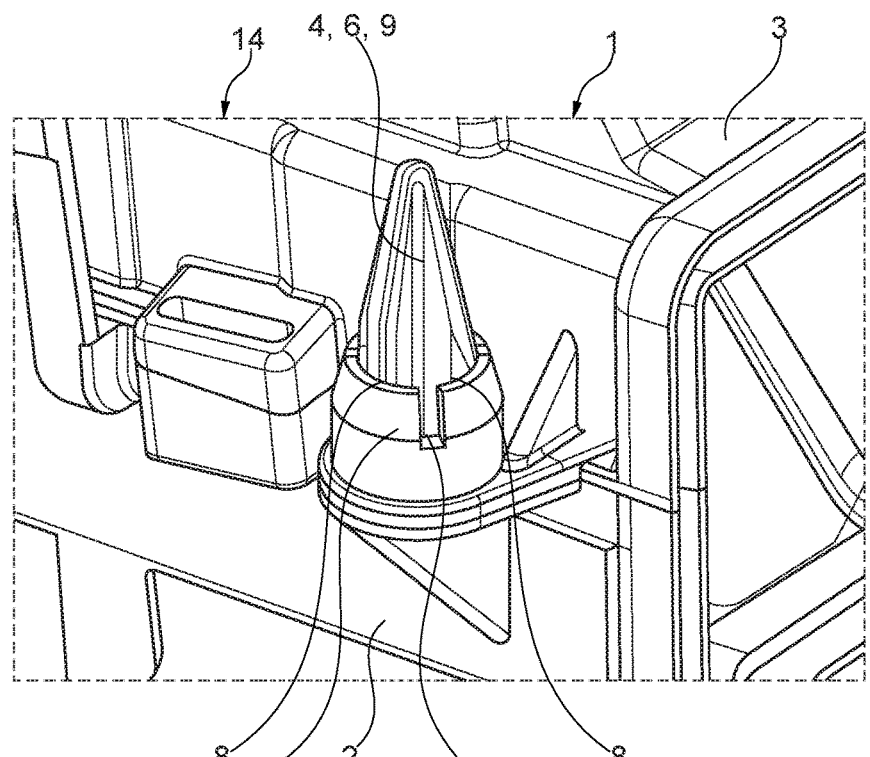
FIG. 3 shows a view of a further possible embodiment of the clip connection according to the invention.

Looking at the clip connection 1 according to FIGS. 1 and 2, the arrow tip 6 there is likewise designed in the form of a crosshead tip, but it has just a single barb 10, which is latched on a periphery 8 of a window 12. A crosshead tip here is considered to have a geometry in the manner of a Phillips screwdriver. In the embodiments of the clip connection 1 according to the invention in FIGS. 3 and also 6 and 7, the arrow tip 6 is likewise designed in the form of a crosshead tip with a total of two barbs 10, wherein, of course, four barbs 10 are also conceivable and wherein the annular periphery 8 forming the mating latching contour 5 is interrupted at four locations 13, and therefore the latching contour 4 can be released from the mating latching contour 5 by rotation. The clip connection 1 is closed here only if the barb 10 is aligned with the periphery 8 in the radial direction of the arrow tip 6, whereas the clip connection 1 is released if the barb 10 is aligned radially with the interrupted location 13.

In order for it to be possible for the clip connection 1 according to the invention to be produced, in addition, in a cost-effective, but relatively high-quality, manner, the latching contour 4 and/or the mating latching contour 5 may be formed from plastics material, in particular in the form of a plastics injection moulding. It is also possible for the two components to be designed in the form of housing parts and, together, to form a housing 14, as is illustrated, for example, according to FIGS. 1 to 3.

The clip connection 1 according to the invention, in particular, renders a hitherto separate positioning device 9 superfluous, it therefore being possible for the function of said positioning device to be integrated in the clip connection 1. In addition to cutting back on the amount of material used, this also makes it possible, in addition, to achieve reduced tool costs, since easier-design production is possible here.

The invention claimed is:

1. A clip connection comprising:
   a latching contour arranged on a first component, the latching contour having an arrow tip in the form of a crosshead tip with a single barb, the crosshead tip including two crossing members extending along an entire length of the latching contour and terminating at a pointed tip, each of the crossing members having a tapered end, the tapered ends converging to meet at the pointed tip, the single barb being formed on one of the crossing members; and
   a mating latching contour arranged on a second component, the mating latching contour having a complementary opening with a periphery forming the mating latching contour;
   wherein the latching contour and the mating latching contour are positioning devices for positioning the components correctly in relation to one another; and
   wherein a window having an enclosed boundary is formed in a wall of the second component, the single barb engaging with a periphery of the window.

2. A clip connection according to claim 1, wherein at least one of the latching contour and the mating latching contour is formed from plastics material.

3. A clip connection according to claim 2, wherein the latching contour and the mating latching contour are formed from plastics material.

4. A housing comprising two housing parts and a clip connection connecting the two housing parts, the clip connection including:
   a latching contour arranged on a first of the two housing parts, the latching contour having an arrow tip with a single barb, the latching contour having a cross-section in the form of a crosshead having two crossing members extending along an entire length of the latching contour and terminating at a pointed tip, each of the crossing members having a tapered end, the tapered ends converging to meet at the pointed tip, the single barb being formed on one of the crossing members; and a mating latching contour arranged on a second of the two housing parts, the mating latching contour having a complementary opening with a periphery forming the mating latching contour;

wherein the latching contour and the mating latching contour are positioning devices for positioning the two housing parts correctly in relation to one another; and wherein a window having an enclosed boundary is formed in a wall of the second component, the single barb engaging with a periphery of the window.

5. A housing according to claim 4, wherein at least one of the latching contour and the mating latching contour is formed from plastics material.

6. A housing according to claim 5, wherein the latching contour and the mating latching contour are formed from plastics material.

7. A clip connection comprising:

a latching contour arranged on a first component, the latching contour having an arrowtip; and a mating latching contour arranged on a second component, the mating latching contour having a complementary opening with a periphery forming the mating latching contour;

wherein the arrow tip comprises a single barb, the latching contour having a cross-section in the form of a crosshead having two crossing members extending along an entire length of the latching contour and terminating at a pointed tip, each of the crossing members having a tapered end, the tapered ends converging to meet at the pointed tip, the single barb being formed on one of the crossing members; and wherein a window having an enclosed boundary is formed in a wall of the second component, the single barb engaging with a periphery of the window.

8. A clip connection according to claim 7, wherein at least one of the latching contour and the mating latching contour is formed from plastics material.

9. A clip connection according to claim 8, wherein the latching contour and the mating latching contour are formed from plastics material.

* * * * *